(12) United States Patent
Cho et al.

(10) Patent No.: US 10,820,215 B2
(45) Date of Patent: Oct. 27, 2020

(54) NODE UNIT OF DISTRIBUTED ANTENNA SYSTEM

(71) Applicant: SOLiD, INC., Seongnam-si, Gyeonggi-do (KR)

(72) Inventors: Youngman Cho, Seoul (KR); Doyoon Kim, Bucheon-si (KR); Jinhwa Ku, Yongin-si (KR); Hyoungho Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/546,186

(22) PCT Filed: Apr. 23, 2015

(86) PCT No.: PCT/KR2015/004056
§ 371 (c)(1),
(2) Date: Jul. 25, 2017

(87) PCT Pub. No.: WO2016/167394
PCT Pub. Date: Oct. 20, 2016

(65) Prior Publication Data
US 2018/0027431 A1    Jan. 25, 2018

(30) Foreign Application Priority Data

Apr. 17, 2015 (KR) .................. 10-2015-0054619

(51) Int. Cl.
*H04W 24/00* (2009.01)
*H04W 24/04* (2009.01)
(Continued)

(52) U.S. Cl.
CPC .......... *H04W 24/04* (2013.01); *H04B 17/103* (2015.01); *H04B 17/19* (2015.01); *H04B 17/336* (2015.01);
(Continued)

(58) Field of Classification Search
USPC .................. 455/424, 501, 67.13; 370/329
See application file for complete search history.

(56) References Cited

U.S. PATENT DOCUMENTS 9,112,547 B2 * 8/2015 Scheinert ............... H04B 7/022
9,603,032 B2 * 3/2017 Ko .......................... H04B 7/024
(Continued)

OTHER PUBLICATIONS

International Search Report for PCT/KR2015/004056, dated Jan. 15, 2016.
(Continued)

*Primary Examiner* — David Q Nguyen
(74) *Attorney, Agent, or Firm* — Sughrue Mion, PLLC (57) ABSTRACT

The present invention provides a distributed antenna system for automatically detecting an abnormally operating node unit. According to an embodiment of the present invention, a node unit of the distributed antenna system includes a signal input unit configured to receive and output first through n-th state information from n other node units connected to the node unit, where n is a natural number greater than or equal to 2; and a controller configured to analyze the first through n-th state information and to determine states of uplink signals respectively corresponding to the first through n-th state information. Each of the n other node units may analyze a signal received through a service antenna and generate the state information.

16 Claims, 5 Drawing Sheets

(51) Int. Cl.
*H04B 17/19* (2015.01)
*H04B 17/354* (2015.01)
*H04B 17/10* (2015.01)
*H04B 17/336* (2015.01)
*H04W 88/08* (2009.01)

(52) U.S. Cl.
CPC ......... *H04B 17/354* (2015.01); *H04W 88/085* (2013.01)

(56) References Cited

U.S. PATENT DOCUMENTS

| | | | | |
|---|---|---|---|---|
| 2013/0095870 A1* | 4/2013 | Phillips | .............. | H04W 52/146 455/501 |
| 2013/0037750 A1 | 12/2013 | Ko | | |
| 2013/0337750 A1* | 12/2013 | Ko | ........................ | H04W 24/00 455/67.13 |
| 2014/0016583 A1* | 1/2014 | Smith | ................ | H04J 14/0227 370/329 |
| 2014/0024402 A1* | 1/2014 | Singh | .................... | H04B 17/12 455/501 |
| 2015/0098350 A1* | 4/2015 | Mini | ..................... | H04W 24/10 370/252 |
| 2015/0296527 A1* | 10/2015 | Ranson | ............... | H04W 88/085 370/329 |
| 2016/0135184 A1* | 5/2016 | Zavadsky | ................ | H04B 7/04 370/329 |
| 2017/0126458 A1* | 5/2017 | Shattil | ................ | H04W 52/241 |
| 2017/0214420 A1* | 7/2017 | Phillips | ................ | H04B 1/1027 |
| 2017/0366386 A1* | 12/2017 | Kummetz | ............... | H04L 27/34 |

OTHER PUBLICATIONS

Notification of Reason for Refusal issued in the Korean Patent Office in corresponding Korean Application No. 10-2015-0054619 dated Sep. 2, 2019.

* cited by examiner

NODE UNIT OF DISTRIBUTED ANTENNA SYSTEM

CROSS-REFERENCE TO RELATED APPLICATIONS

This application is a National Stage of International Application No. PCT/KR2015/004056, filed Apr. 23, 2015, and claims priority from Korean Patent Application No. 10-2015-0054619 filed Apr. 17, 2015, the contents of which are incorporated herein by reference in their entireties.

BACKGROUND

1. Field

The present invention relates to a distributed antenna system (DAS), and more particularly, to uplink transmission of a node unit of a DAS.

2. Description of the Related Art

Conventionally, when there are service errors in a distributed antenna system (DAS), existence or non-existence of an abnormality is checked at a place where equipment is located using a spectrum analyzer. An operator connects the spectrum analyzer to a coupling port of the equipment and checks the abnormality of the equipment. With this method, it is difficult to monitor the malfunction of the DAS in the following cases. For instance, since the DAS includes a plurality of units such as a base station interface unit and a master unit which form a headend node, a hub unit forming an extension node, and a remote unit forming a remote node, it is difficult for the operator to find out which unit has a problem. In addition, when a unit has been installed in a place, such as a subway or a repeater tower, which is not easy to physically access, it is difficult to check whether or not the unit is abnormal with the above-described method. Moreover, when a service signal is degraded due to an abnormality of a power amplification unit (PAU), the abnormality of the PAU is hard to be detected; when an abnormality of an uplink signal occurs due to a fault in a particular remote unit, it is hard to detect the faulty remote unit.

In particular, when, among a plurality of remote units forming a DAS, even only one remote unit has a problem, it may cause a failure in entire reverse communication of a base station that includes the remote unit. For example, when digital overflow occurs in one of the remote units due to abnormal gain control of an uplink signal, the remote unit cannot process the uplink signal and noise may occur in the entire band. Therefore, a DAS for automatically detecting a problematic remote unit among a plurality of remote units is desired.

SUMMARY

The present invention is directed to a distributed antenna system (DAS) for automatically detecting an abnormally operating remote unit.

According to an aspect of the present invention, a node unit of a distributed antenna system, the node unit includes a signal input unit configured to receive and output n-th state information from an n-th other unit among n other units connected to the node unit, where n is a natural number greater than or equal to 2; and a controller configured to analyze the n-th state information and determine a state of an n-th uplink signal received from the n-th other unit, wherein the n-th other unit analyzes a signal received through a service antenna and generates the n-th state information.

The controller may control the n-th uplink signal not to be transmitted to a base station when the n-th uplink signal is determined as abnormal.

The controller may transmit the n-th state information to a monitoring device connected to the node unit and the monitoring device may analyze the n-th state information and determine whether the n-th other unit operates normally.

The node unit may further include a digital signal processor configured to generate a first combined signal by combining normal uplink signals among first through n-th uplink signals according to first state notification information through n-th state notification information, wherein the controller may analyze first state information through the n-th state information respectively received from the n other units and generate the first state notification information through the n-th state notification information.

The node unit may further include a digital signal processor configured to generate a second combined signal by combining abnormal uplink signals among first through n-th uplink signals according to first state notification information through n-th state notification information, wherein the controller may analyze first state information through the n-th state information respectively received from the n other units and generate the first state notification information through the n-th state notification information.

The node unit may further include a digital signal processor configured to process a power level of the n-th uplink signal to correspond to n-th weight information when receiving the n-th weight information, wherein the controller may analyze a signal-to-noise ratio (SNR) included in the n-th state information and generate the n-th weight information.

According to another aspect of the present invention, a remote unit of a distributed antenna system, the remote unit includes a service antenna configured to receive and output an uplink signal from a mobile communication terminal; and a controller configured to analyze the uplink signal, generate state information, analyze the state information, and determine whether to transmit the uplink signal.

The controller may generate the state information using at least one selected from the group consisting of a signal-to-noise ratio (SNR), a voltage standing wave ratio (VSWR), and an adjacent channel leakage ratio (ACLR) with respect to the uplink signal.

The remote unit may further include a signal input/output unit configured to receive an other unit uplink signal and other unit state information from another unit connected to the remote unit, wherein the controller may analyze the other unit state information and determine a method of transmitting the other unit uplink signal.

The controller may control the uplink signal and the other unit uplink signal to be combined and then transmitted to an upper node when the other unit uplink signal is determined as normal according to an analysis result.

The controller may analyze the state information, determine whether the uplink signal is normal, analyze the other unit state information, determine whether the other unit uplink signal is normal, control signals determined as normal to be combined into a third combined signal, and control signals determined as abnormal to be combined into a fourth combined signal.

According to still another aspect of the present invention, a distributed antenna system includes n remote units each configured to generate state information regarding an uplink signal received from a mobile communication terminal and to transmit the state information and the uplink signal, where n is a natural number greater than or equal to 2; and a master unit configured to analyze the state information received from each of the n remote units and to determine whether to transmit the uplink signal to a base station connected to the master unit.

The master unit may analyze the state information, generate a first combined signal by combining only normal uplink signals, and transmit the first combined signal to the base station.

The distributed antenna system may further include a monitoring device configured to analyze the state information and to detect an abnormally operating other unit among the other units, wherein the master unit may transmit the state information to the monitoring device connected to the master unit.

The master unit analyzes the state information, generates a second combined signal by combining only abnormal uplink signals, and determines whether to transmit the second combined signal to the base station.

According to a further aspect of the present invention, a distributed antenna system includes n remote units each configured to generate state information regarding an uplink signal received from a mobile communication terminal, to analyze the state information, and to determine whether to transmit the uplink signal, where n is a natural number greater than or equal to 2; and a master unit configured to combine uplink signals and to transmit a combined result to a base station.

Each of the remote units may generate the state information using at least one selected from the group consisting of a signal-to-noise ratio (SNR), a voltage standing wave ratio (VSWR), and an adjacent channel leakage ratio (ACLR) with respect to the uplink signal.

According to the present invention, a distributed antenna system (DAS) for automatically detecting an abnormally operating remote unit can be provided.

BRIEF DESCRIPTION OF THE FIGURES

The drawings referred to in the detailed description of the present invention will be briefly described.

DETAILED DESCRIPTION OF EXEMPLARY EMBODIMENTS

The detailed description will be set forth with reference to the drawings showing specific embodiments. However, embodiments of the present invention will not be restricted to the specifically disclosed features described below but will include any modifications, equivalents, or substitutes that do not depart from the spirit and scope of the present invention.

In the description of the present invention, when the detailed description for the known technology in the related art may blur the gist of the present invention, the detailed description will be omitted. Although terms such as first, second and the like may be used in the description of the embodiments, these terms are only used to distinguish one element from another. It will be understood that when an element is referred to as being "connected" or "coupled" to another element, it can be directly connected or coupled to the other element or intervening elements may be present unless otherwise defined. As used herein, terminology such as "part (or unit)", "~or", "~er", and "module" may indicate a unit which processes at least one function or operation and may be implemented by hardware, software, or a combination thereof.

It should be clearly understood that elements are just defined by their main functions. In detail, two or more elements may be integrated into one element or one element may be divided into two or more elements by their subdivided functions. Each of the elements which will be described below may partially or fully perform the function of another element in addition to its own main function and part of the main function of each element may be exclusively performed by another element.

A distributed antenna system (DAS) according to an embodiment of the present invention is a coverage system for an in-building service which provides high-quality voice and data communications with seamless access. In addition, the DAS is a system for servicing, through one antenna, analog and digital telephone systems serviced in multiple bands. The DAS may be installed in public institutions and private facilities, such as shopping malls, hotels, campuses, airports, hospitals, subways, sports complexes, and convention centers. The DAS improves a poor propagation environment in a building, improves poor received signal strength indication (RSSI) and chip energy/others interference (Ec/Io) which is total receiving sensitivity of a mobile terminal, and provides a mobile communication service up to the corners of the building to allow service users to freely use the service at any place in the building.

For example, the DAS may support frequencies such as a very high frequency (VHF), an ultra high frequency (UHF), 700 MHz, 800 MHz, 850 MHz, 900 MHz, 1900 MHz, 2100 MHz band, 2600 MHz band and the like; a frequency-division duplexing (FDD) service; and a time-division duplexing (TDD) service. In addition, the DAS may support multiple mobile communication standards such as an advanced mobile phone service (AMPS), which is a representative of analog mobile communication services, and digital mobile communication services like time-division multiplexing access (TDMA), code division multiple access (CDMA), wideband CDMA (WCDMA), high-speed downlink packet access (HSDPA), long term evolution (LTE), and long term evolution advanced (LTE-A).

Hereinafter, embodiments of the present invention will be described in detail.

Figure 1:
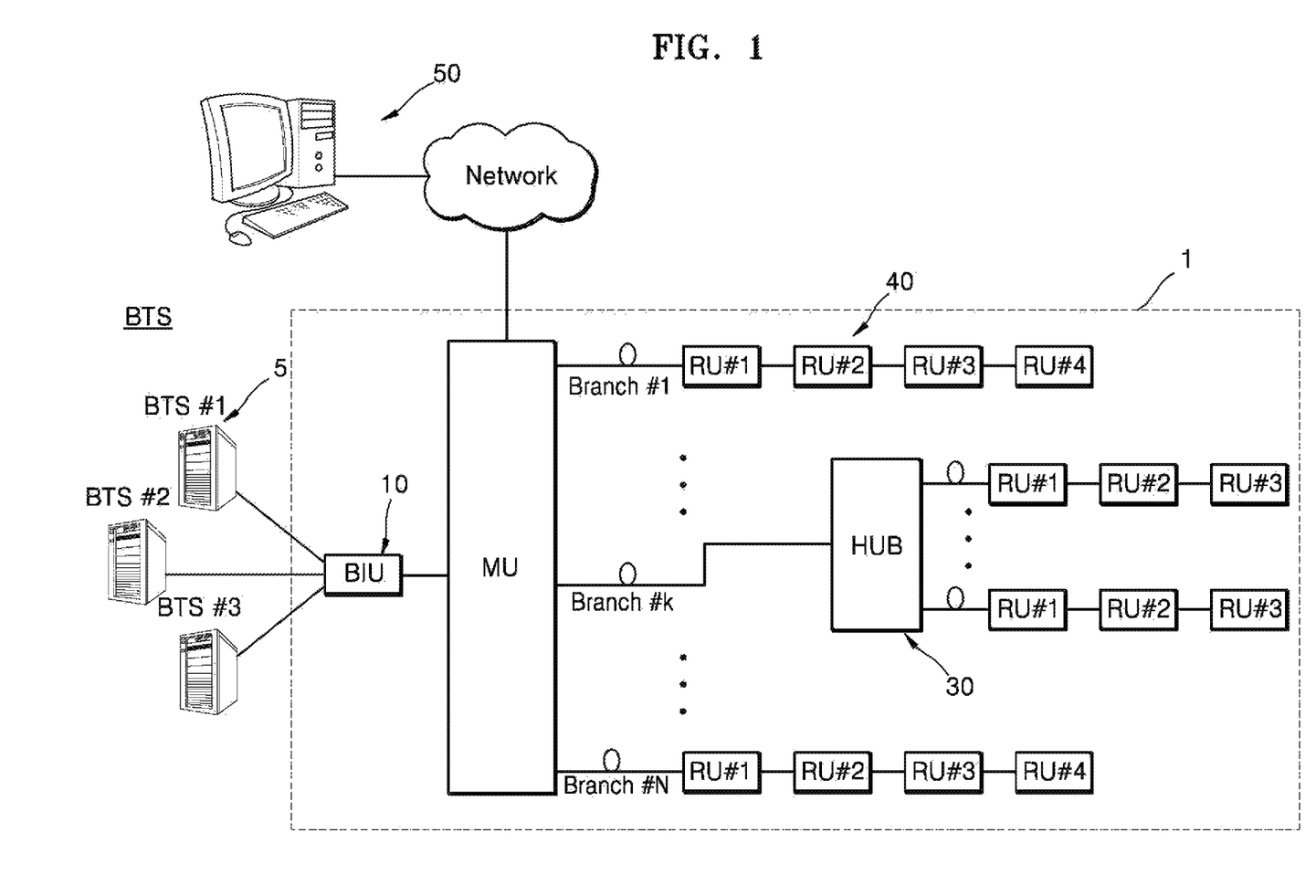
FIG. 1 is a diagram of an example of the topology of a distributed antenna system (DAS) provided as one form of a signal distributed transmission system to which the present invention is applicable.

FIG. 1 is a diagram of an example of the topology of a DAS provided as one form of a signal distributed transmission system to which the present invention can be applied.

Referring to FIG. 1, a DAS 1 includes a base station interface unit (BIU) 10 and a master unit (MU) 20 which form a headend node, a hub unit (HUB) 30 forming an extension node, and a plurality of remote units (RUs) 40 which are installed at remote service locations and form a remote node. The DAS 1 may be implemented as an analog DAS, a digital DAS, or a combination (in which, for example, some of nodes perform analog processing and the rest of them perform digital processing) thereof.

FIG. 1 shows an example of the topology of the DAS 1. The topology of the DAS 1 may be changed in various ways according to the distinct characteristics of installation areas and application fields (e.g., in-building, subway, hospitals, stadiums and the like). In this regard, the numbers of BIU 10, MU 20, HUB 30, and RUs 40 and connection relationship between upper and lower nodes among BIU 10, MU 20, HUB 30, and RUs 40 may also be different from those shown in FIG. 1. In the DAS 1, the HUB 30 is used when the number of branches coming out from the MU 20 in a star structure is limited as compared to the number of RUs 40 required to be installed. Accordingly, the HUB 30 may be omitted when the single MU 20 can cover all the RUs 40 required to be installed, when a plurality of MUs 20 are installed, or the like.

Hereinafter, each node and its function in the DAS 1 to which the present invention is applicable will be described based on the topology shown in FIG. 1.

The BIU 10 serves as an interface between a base station transceiver system (BTS) in a base station or the like and the MU 20 in the DAS 1. Although a plurality of BTSs are connected with the single BIU 10 in FIG. 1, the BIU 10 may be separately provided for each provider, each frequency band, or each sector.

Since a radio frequency (RF) signal transmitted from a BTS is usually a high-power signal, the BIU 10 converts the high-power RF signal into a signal with power suitable to be processed in the MU 20 and transmits the converted signal to the MU 20. As shown in FIG. 1, the BIU 10 may also receive and combine mobile communication service signals for each frequency band (or each provider or each sector) and transmit the combined signal to the MU 20.

When the BIU 10 converts a high-power signal received from each BTS into a low-power signal, combines mobile communication service signals, and transmits the combined signal to the MU 20, the MU 20 distributes the combined signal (hereinafter, referred to as a relay signal) to branches. At this time, when the DAS 1 is implemented as a digital DAS, the BIU 10 may be separated into a unit which converts a high-power RF signal from each BTS into a low-power RF signal and a unit which converts the low-power RF signal into an intermediate frequency (IF) signal, performs digital signal processing on the IF signal, and combines processed signals. Alternatively, when the BIU 10 only converts a high-power signal from a BTS into a low-power signal, the MU 20 may combine relay signals and distribute the combined relay signal to branches.

As described above, the combined relay signal distributed by the MU 20 is transmitted to the RUs 40 directly or through the HUB 20 for each branch (see Branch #1, . . . , Branch #1, . . . , Branch # N in FIG. 1). Each of the RUs 40 divides the combined relay signal for each frequency band and performs signal processing (i.e., analog signal processing in case of an analog DAS and digital signal processing in case of a digital DAS). Accordingly, each RU 40 transmits a relay signal to a user terminal within the service coverage of the RU 40 through a service antenna. The function of the RU 40 will be described in detail later.

Although a case where a BTS is connected with the BIU 10 using an RF cable, the BIU 10 is connected with the MU 20 using an RF cable, and the MU 20 is connected with a lower node using an optical cable is illustrated in FIG. 1, a signal transport medium between nodes may be variously changed. For example, the BIU 10 and the MU 20 may be connected using an optical cable or digital interface instead of an RF cable. As another example, the MU 20 may be connected with the HUB 30 using an optical cable, the MU 20 may be directly connected with an RU 40 using an optical cable, and the RUs 40 may be connected in cascade using an RF cable, a twist cable, a UTP cable or the like. As a still another example, the MU 20 may be directly connected with an RU 40 using an RF cable, a twist cable, a UTP cable or the like.

Although it is illustrated in FIG. 1 that the BIU 10 is located between a BTS and the MU 20, the BIU 10 may be implemented as one function of the MU 20. The BIU 10 may be omitted when a signal transmitted from a BTS is not a high-power signal. The BIU 10 may not be implemented as a separate device as shown in FIG. 1 but may be implemented as a functional part in the MU 20. In this case, the MU 20 may convert a high-power RF signal received from a BTS into a low-power RF signal and may combine low-power RF signals for each frequency band (or each provider or each sector).

Hereinafter, description will be made based on FIG. 1. In a current embodiment, the MU 20, the HUB 30, and the RUs 40 may include an optical transceiver module for electrical-to-optical conversion/optical-to-electrical conversion and, when nodes are connected with each other through a single optical cable, may include a wavelength division multiplexing (WDM) device.

The DAS 1 may be connected with an external monitoring device 50, e.g., a network management server or system, through a network. Accordingly, an operator can monitor the state and problems of each node of the DAS 1 and control the operation of the node in a remote place through the monitoring device 50.

Figure 2:
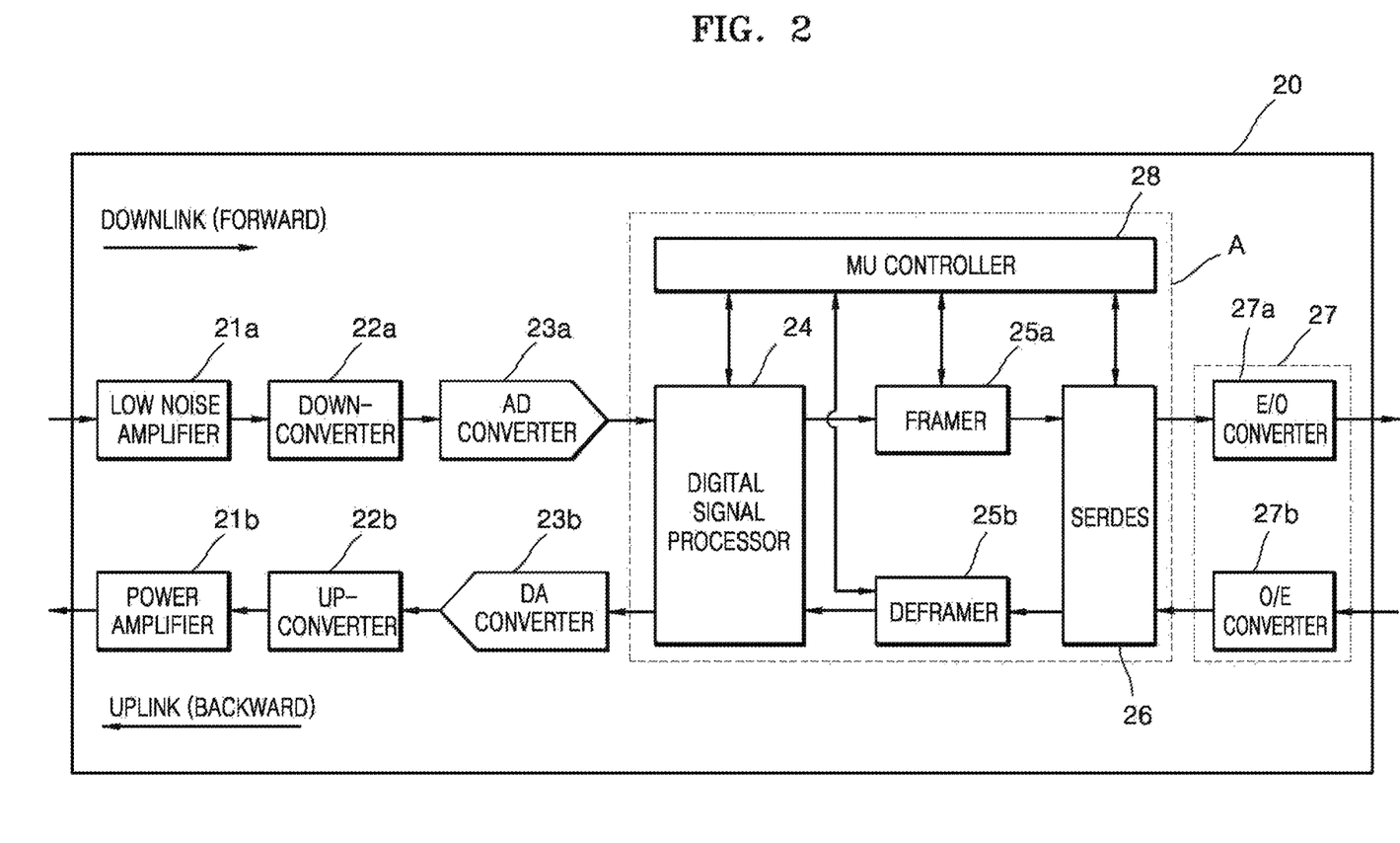
FIG. 2 is a block diagram of an embodiment of a master unit in a DAS to which the present invention is applicable.

FIG. 2 is a block diagram of an embodiment of an MU in a DAS to which the present invention is applicable.

Here, FIG. 2 shows a case where the MU 20 is connected with the BIU 10 using an RF cable and is connected with the HUB 30 or an RU 40 using an optical cable. FIG. 2 shows elements only related to a function of transmitting a service signal to the HUB 30 or the RU 40 in a forward path and processing a signal received from the HUB 30 or the RU 40 in a reverse path.

Referring to FIG. 2, the MU 20 includes a low noise amplifier 21a, a down-converter 22a, an analog-to-digital (AD) converter 23a, a digital signal processor 24, a framer 25a, a serializer/deserializer (SERDES) 26, and an electrical-to-optical (E/O) converter 27a based on a downlink transmission path (i.e., the forward path).

Accordingly, in the forward path, an RF signal transmitted through an RF cable is low-noise amplified by the low noise amplifier 21a and then frequency down-converted into an IF signal by the down-converter 22a. The IF signal is converted into a digital signal by the AD converter 23a and then transmitted to the digital signal processor 24.

The digital signal processor 24 performs digital signal processing, digital filtering, gain control, digital multiplexing and the like on a relay signal for each frequency band. A digital signal output from the digital signal processor 24 is formatted into a format suitable to digital transmission by the framer 25a, then converted into a serial digital signal by the SERDES 26, and then converted into an optical digital signal by the E/O converter 27a included in a signal input/output (I/O) unit 27 to be transmitted to a lower node through an optical cable.

Meanwhile, the MU 20 includes an optical-to-electrical (O/E) converter 27b, the SERDES 26, a deframer 25b, the digital signal processor 24, a digital-to-analog (DA) converter 23b, an up-converter 22b, and a power amplifier 21b based on an uplink transmission path (i.e., the reverse path).

In the reverse path, an optical relay signal digitally transmitted through an optical cable is converted into an electrical signal (or a serial digital signal) by the O/E converter 27b included in the signal I/O unit 27. The serial digital signal is converted into a parallel digital signal by the SERDES 26. The parallel digital signal is reformatted by the deframer 25b to be processed for each frequency band in the digital signal processor 24. A digital signal output from the digital signal processor 24 is converted into an analog signal by the DA converter 23b connected to the back end of a digital part A based on the signal transmission path. The analog signal is an IF signal and is frequency up-converted by the up-converter 22b into an analog signal in the original RF band. The analog signal converted to have the original RF band (i.e., an RF signal) is amplified by the power amplifier 21b and then transmitted to the BIU 10 through an RF cable.

In FIG. 2, the digital signal processor 24, the framer 25a, the deframer 25b, the SERDES 26, and an MU controller 28 may constitute the digital part A. At this time, the digital signal processor 24, the framer 25a, the deframer 25b, and the SERDES 26 may be implemented in a field programmable gate array (FPGA) and the MU controller 28 may be implemented in the FPGA or as a separate device. Although it is illustrated that the digital signal processor 24 and the SERDES 26 are commonly used in both the downlink and uplink transmission paths, the digital signal processor 24 and the SERDES 26 may be separately provided for each of the paths. It is illustrated in FIG. 2 that the E/O converter 27a and the O/E converter 27b are separately provided, but the E/O converter 27a and the O/E converter 27b may be implemented as a single optical transceiver module (e.g., a single small form factor pluggable (SFP)) 27.

Although it is illustrated in FIG. 2 that the MU 20 includes the power amplifier 21b and the up-converter 22b, the power amplifier 21b or the up-converter 22b may be omitted when the BIU 10 includes a unit which converts a high-power RF signal into a low-power RF signal and a unit which converts the low-power RF signal into an IF signal, performs digital signal processing on the IF signal, and combines processed signals, as described above. Similarly, the low noise amplifier 21a or the down-converter 22a may be omitted according to the configuration of the BIU 10.

Although not mentioned in the above description of the downlink and uplink transmission paths, the MU 20 may also include the MU controller 28. The MU controller 28 may be configured to transmit/receive signals to/from the digital signal processor 24, the framer 25a, the deframer 25b, and the SERDES 26 to control all operations of the MU 20 or transmit a control signal to the HUB 30 or the RU 40. In particular, the MU controller 28 may control signal conversion of a node element such as the digital signal processor 24, the framer 25a, the deframer 25b, or the SERDES 26 according to the type of a signal transmitted thereto. A signal received through an antenna of a BTS 5 or the RU 40 may be a CDMA signal, a WCDMA signal, an LTE signal, or a WiBro signal. The MU controller 28 may determine the type of the received signal. According to the determined type of the signal, the MU controller 28 may control a node element in the MU 20 or transmit, to a lower node, a command for controlling a node element in the HUB 30 or the RU 40, as described above.

In addition, the MU controller 28 may receive n uplink signals and/or n items of state information from respective n RUs 40, analyze the state information, and determine the state of each of the n uplink signal, where n is a natural number greater than or equal to 2. For clarity of the description, it is assumed that two RUs 40 (i.e., a first RU 40-1 and a second RU 40-2) are connected to the MU 20. The O/E converter 27b of the signal I/O unit 27 in the MU 20 may receive a first uplink signal and/or first state information from the first RU 40-1 and may also receive a second uplink signal and/or second state information from the second RU 40-2. The O/E converter 27b may convert an optical signal into an electrical signal. The electrical signal may be input to the MU controller 28 via the SERDES 26.

The MU controller 28 may analyze the first state information and determine whether the first uplink signal is normal. The MU controller 28 may analyze the second state information and determine whether the second uplink signal is normal. Herein, the first state information may have been generated in the first RU 40-1 and may be information about the state of the first uplink signal. Accordingly, when the first RU 40-1 receives the first uplink signal from a mobile communication terminal through a service antenna thereof, the first RU 40-1 may analyze the first uplink signal and generate the first state information. For example, the first RU 40-1 may analyze whether a predetermined communication standard (e.g., a third generation partnership project (3GPP) standard), such as signal power, a signal-to-noise ratio (SNR), a voltage standing wave ratio (VSWR), an adjacent channel leakage ratio (ACLR), spectral emission mask (SEM), passive intermodulation (PIM), or existence or non-existence of a spurious signal, with respect to the first uplink signal is satisfied to generate the first state information. The second RU 40-2 may generate the second state information using a method the same as or similar to that used by the first RU 40-1. The first RU 40-1 may transmit the first state information to the MU 20 together with the first uplink signal and the second RU 40-2 may transmit the second state information to the MU 20 together with the second uplink signal. The MU controller 28 may analyze the first state information to determine the state of the first uplink signal and may analyze the second state information to determine the state of the second uplink signal.

Meanwhile, the digital signal processor 24 may combine the n uplink signals received from the n RUs 40 into a digital signal. The digital signal may be converted into an analog signal in the DA converter 23b. The analog signal may be transmitted to the BTS 5. At this time, the MU controller 28 may analyze the state information corresponding to each of the n uplink signals and control the digital signal processor 24 to process an uplink signal determined as abnormal differently from uplink signals determined as normal.

For example, the MU controller 28 may control an abnormal uplink signal among the n uplink signals not to be transmitted to a base station, i.e., the BTS 5. In detail, the MU controller 28 may analyze each of the n items of state information received from the n RUs 40 and generate state notification information. The state notification information may include information for distinguishing a normal uplink signal from an abnormal uplink signal. The MU controller 28 may transmit the state notification information to the digital signal processor 24. The digital signal processor 24 may identify an abnormal uplink signal among the n uplink signals using the state notification information. Accordingly, the digital signal processor 24 may combine only normal uplink signals among the n uplink signals into a digital signal and may output the digital signal to the DA converter 23b. Consequently, abnormal uplink signals among the n uplink signals may not be transmitted to the BTS 5.

As another example, the MU controller 28 may perform control so that abnormal uplink signals among the n uplink signals can be distinguished from normal uplink signals among the n uplink signals. In detail, the digital signal processor 24 may combine only normal uplink signals among the n uplink signals using the state notification information to generate a first combined signal. The digital signal processor 24 may also combine abnormal uplink signals among the n uplink signals using the state notification information to generate a second combined signal. The digital signal processor 24 may combine the first combined signal and the second combined signal and may output a combined result to the DA converter 23b. Alternatively, the digital signal processor 24 may sequentially or simultaneously output the first combined signal and the second combined signal to the DA converter 23b without combining the first and second combined signals. With this operation, an influence which an abnormal uplink signal may exert on a normal uplink signal may be decreased and the BTS 5 may readily determine whether to service the abnormal uplink signal which has been received separately from the normal uplink signal.

As still another example, the MU controller 28 may analyze the state information of each of the n uplink signals and generate weight information corresponding to each uplink signal. For instance, it is assumed that n is 2 and the MU controller 28 analyzes the first state information for the first uplink signal and the second state information for the second uplink signal. At this time, the MU controller 28 may analyze an SNR included in the first state information to generate first weight information for the first uplink signal. In detail, the MU controller 28 may analyze a first SNR included in the first state information and generate the first weight information based on a predetermined table (e.g., TABLE 1 below). When the first SNR is 47 dB, the MU controller 28 may generate the first weight information corresponding to "1"; when the first SNR is 37 dB, the MU controller 28 may generate the first weight information corresponding to "0.8". The table may be reset according to an operating environment.

TABLE 1

| SNR[dB] | Weight information |
| --- | --- |
| 45 or greater than 45 | 1 |
| 35 to less than 45 | 0.8 |
| 25 to less than 35 | 0.6 |
| 15 to less than 25 | 0.4 |
| 5 to less than 15 | 0.2 |
| Less than 5 | 0 |

Similarly, the MU controller 28 may analyze an SNR included in the second state information to generate second weight information for the second uplink signal. For instance, the MU controller 28 may analyze a second SNR included in the second state information and generate the second weight information based on TABLE 1 above.

The MU controller 28 may output n-th weight information to the digital signal processor 24. The digital signal processor 24 may process an n-th uplink signal using the n-th weight information. In this example, the digital signal processor 24 may process the first uplink signal using the first weight information. When the first weight information is 0.6, the digital signal processor 24 may process the first uplink signal so that a power level of the first uplink signal is 60% of the original power level. The digital signal processor 24 may process the second uplink signal using the second weight information. When the second weight information is 0.8, the digital signal processor 24 may process the second uplink signal so that a power level of the second uplink signal is 80% of the original power level. The detailed operation of the digital signal processor 24 processing the n-th uplink signal using the n-th weight information is obvious to those skilled in the art and is thus omitted.

Thereafter, the digital signal processor 24 may combine the n uplink signals which have been processed according to the weight information and output a combined result to the DA converter 23b. Accordingly, an uplink signal having much noise may be transmitted to the BTS 5 after the noise level of the uplink signal is lowered. As a result, malfunction which may occur in the reverse communication of an entire system due to noise occurring in a certain RU 40 may be prevented.

Meanwhile, the MU controller 28 may transmit the state information to the monitoring device 50 connected thereto. The monitoring device 50 may analyze the state information and detect an abnormally operating RU (hereinafter, referred to an abnormally operating unit) among the n RUs 40. The monitoring device 50 may inform an operator of the detection of the abnormally operating unit. For example, when an abnormally operating unit is detected, the monitoring device 50 may notify the operator of the existence of the abnormally operating unit and of information about which of the n RUs 40 is the abnormally operating unit, using a method such as a text message, email, or an alarm.

When it is determined that the ACLR performance of an abnormally operating unit is not satisfactory or the uplink signal of the abnormally operating unit includes a spurious signal as a result of analyzing the state information, the monitoring device 50 and/or the MU 20 may control the abnormally operating unit to perform digital filtering on an out-of-band signal, so that the abnormally operating unit is normalized. When it is determined that the SEM performance of an abnormally operating unit is not satisfactory as a result of analyzing the state information, the monitoring device 50 and/or the MU 20 may control the abnormally operating unit to perform shaping filtering on an uplink signal, so that the abnormally operating unit is normalized. When it is determined that the power of an uplink signal of an abnormally operating unit is out of a predefined normal range as a result of analyzing the state information, the monitoring device 50 and/or the MU 20 may control the gain of the uplink signal of the abnormally operating unit, so that the abnormally operating unit is normalized.

Figure 3:
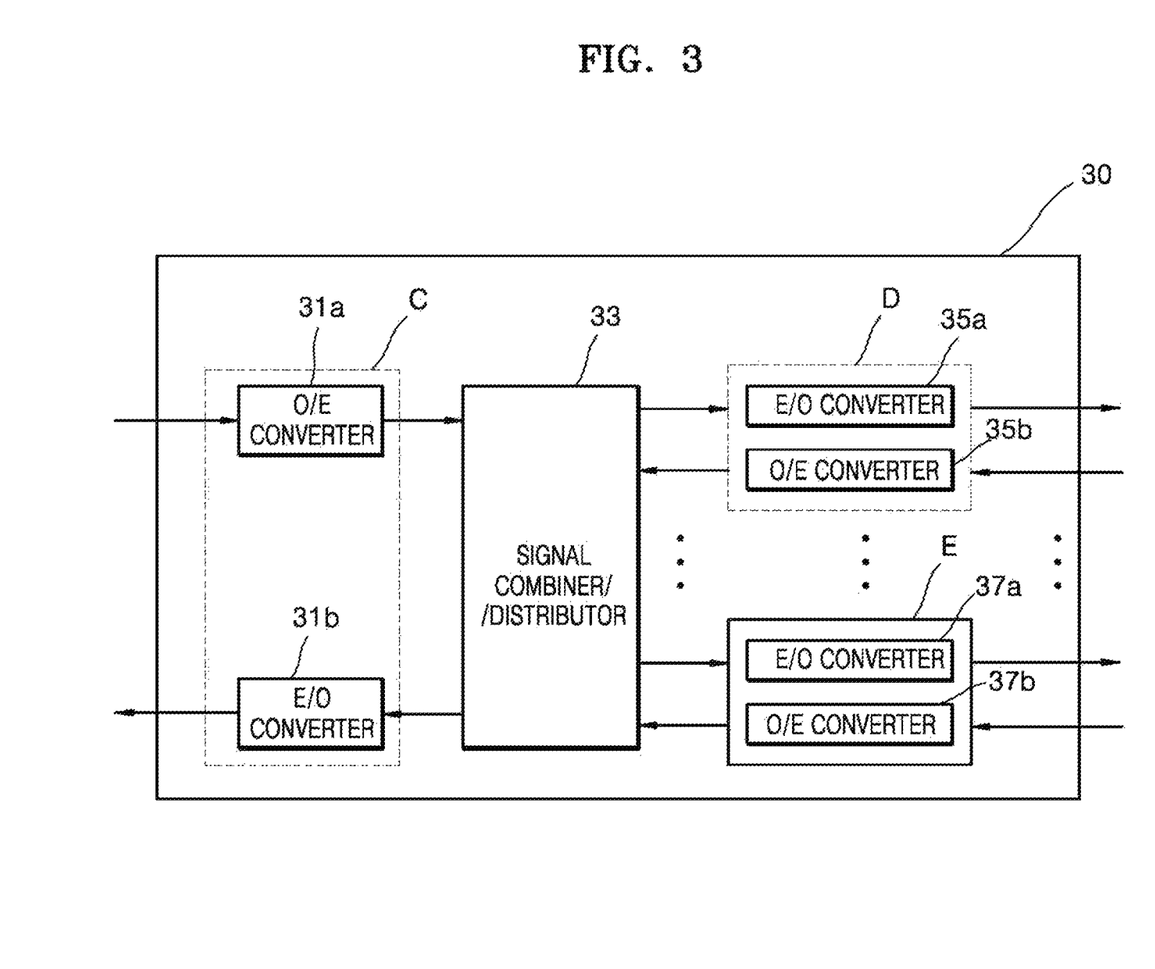
FIG. 3 is a block diagram of an embodiment of a hub unit in a DAS to which the present invention is applicable.

FIG. 3 is a block diagram of an embodiment of a HUB in a DAS to which the present invention is applicable.

Referring to FIG. 3, the HUB 30 includes an O/E converter 31a, a signal combiner/distributor 33, and E/O converters 35a and 37a based on the downlink transmission path. An optical relay signal transmitted from the MU 20 through an optical cable is converted into an electrical signal by the O/E converter 31a. The signal combiner/distributor 33 repeats the electrical signal to the E/O converters 35a and 37a. Each of the E/O converters 35a and 37a receives and converts the electrical signal into an optical relay signal and transmits the optical relay signal to an RU 40 at a lower node. Although two E/O converters 35a and 37a are illustrated in FIG. 3 for clarity of the description, as many E/O converters as the number of the RUs 40 may be provided.

The HUB 30 includes O/E converters 35b and 37b, the signal combiner/distributor 33, and an E/O converter 31b based on the uplink transmission path. An optical relay signal transmitted from an RU 40 through an optical cable is converted into an electrical signal by each of the O/E converters 35b and 37b. The signal combiner/distributor 33 combines electrical signals and transmits a combined electrical signal to the E/O converter 31b. The E/O converter 31b converts the combined electrical signal into an optical relay signal and transmits the optical relay signal to the MU 20 at an upper node.

Although it is illustrated in FIG. 3 that the O/E converters 31a, 35b, and 37b and the E/O converters, 31b, 35a, and 37a are all separated from one another, each of the O/E converters 31a, 35b, and 37b and a corresponding one of the E/O converters, 31b, 35a, and 37a may be implemented as a single optical transceiver module C, D, or E.

Figure 4:
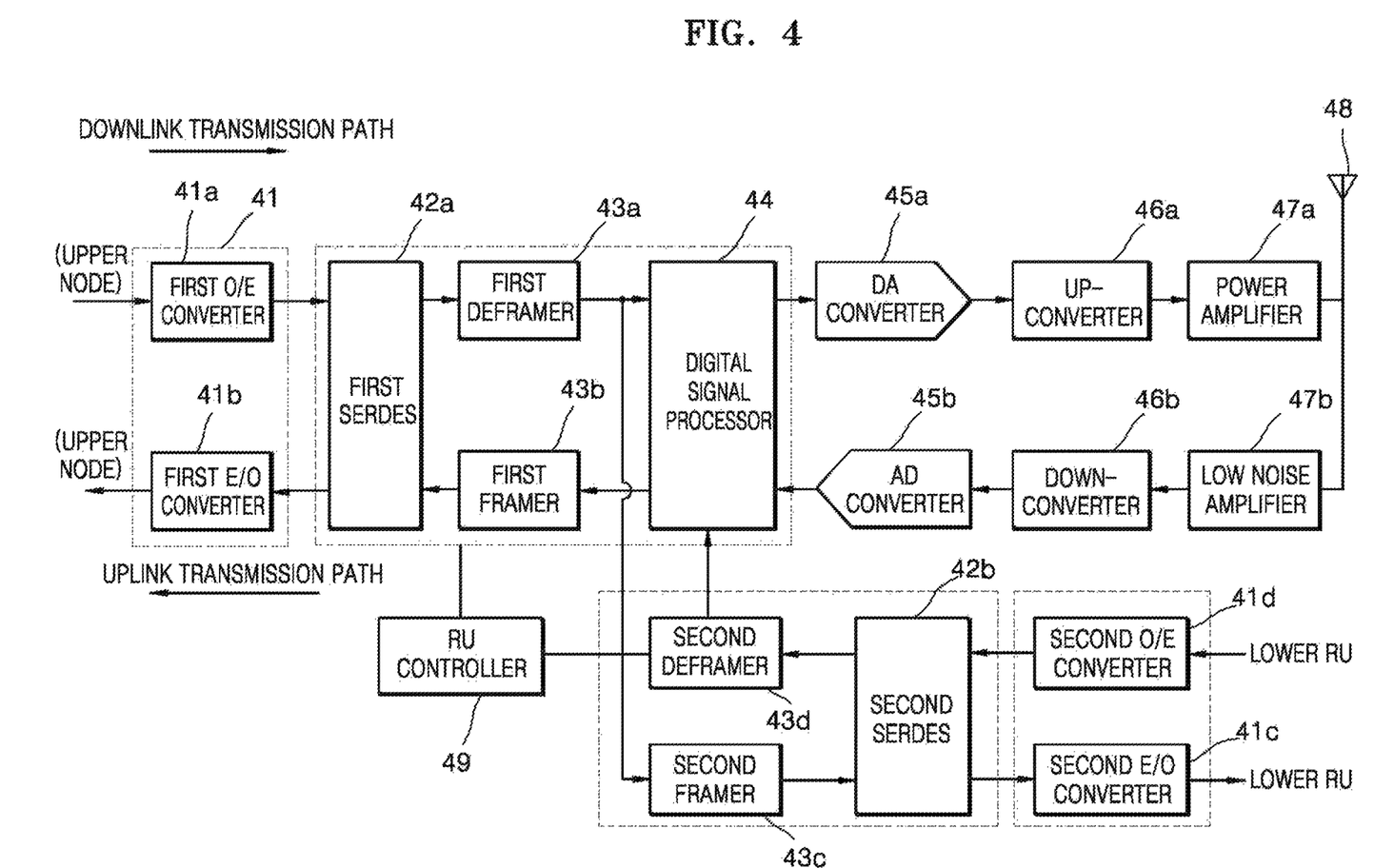
FIG. 4 is a block diagram of an embodiment of a remote unit in a DAS to which the present invention is applicable.

FIG. 4 is a block diagram of an embodiment of an RU in a DAS to which the present invention is applicable.

Here, FIG. 4 illustrates an embodiment of an RU 40 in a digital DAS in which an optical cable is used to connect nodes with each other. FIG. 4 shows some elements of the RU 40 which are related to a function of providing a service signal to a terminal within a service area through a downlink path and processing a terminal signal received from a terminal within the service area through an uplink path.

Referring to FIG. 4, the RU 40 includes a first O/E converter 41a, a first SERDES 42a, a first deframer 43a, a second framer 43c, a second SERDES 42b, a second E/O converter 41c, a digital signal processor 44, a DA converter 45a, an up-converter 46a, and a power amplifier 47a based on the downlink transmission path (i.e., the forward path).

An optical relay signal digitally transmitted through an optical cable in the forward path is converted into an electrical signal (or a serial digital signal) by the first O/E converter 41a. The serial digital signal is converted into a parallel digital signal by the first SERDES 42a. The parallel digital signal is reformatted by the first deframer 43a to be processed by the digital signal processor 44 for each frequency band. The digital signal processor 44 performs a function, such as digital signal processing, digital filtering, gain control, or digital multiplexing, on the relay signal for each frequency band. A digital signal output from the digital signal processor 44 is converted into an analog signal by the DA converter 45a. At this time, the analog signal is an IF signal and is thus frequency up-converted by the up-converter 46a into an analog signal in the original RF band. The analog signal in the original RF band (i.e., an RF signal) is amplified by the power amplifier 47a and then sent out through a service antenna 48.

Meanwhile, in the forward path, the RU 40 may output the reformatted signal from the first deframer 43a to the second framer 43c to transmit a downlink signal to another unit (e.g., another RU 40 or the HUB 30) at a lower node through an optical cable. In detail, the reformatted signal from the first deframer 43a may be output to the second framer 43c and the second framer 43c may reformat the reformatted signal before outputting it to the second SERDES 42b. The second SERDES 42b may convert an input signal into a serial digital signal and output the serial digital signal to the second E/O converter 41c. The second E/O converter 41c may convert an input signal into an optical digital signal and transmit the optical digital signal to another unit at a lower node through an optical cable.

The RU 40 includes a low-noise amplifier 47b, a down-converter 46b, an AD converter 45b, the digital signal processor 44, a first framer 43b, the first SERDES 42a, and a first E/O converter 41b based on the uplink transmission path (i.e., the reverse path). In addition, the RU 40 may include a second O/E converter 41d, the second SERDES 42b, and a second deframer 43d in the uplink transmission path to process an uplink signal received from another unit at a lower node.

Accordingly, in the reverse path, an RF signal (i.e., a terminal signal) received through a service antenna 48 from a user terminal (not shown) within a service coverage is low-noise amplified by the low-noise amplifier 47b and then frequency down-converted into an IF signal by the down-converter 46b. The IF signal is converted into a digital signal by the AD converter 45b and then transmitted to the digital signal processor 44. A digital signal output from the digital signal processor 44 is formatted into a format suitable to digital transmission by the first framer 43b, then converted into a serial digital signal by the first SERDES 42a, and then converted into an optical digital signal by the first E/O converter 41b to be transmitted to an upper node through an optical cable.

Meanwhile, an uplink signal (hereinafter, referred to as an "other unit uplink signal" to be distinguished from an uplink signal received through the service antenna 48) received from another unit at a lower node through an optical cable in the reverse path and state information (hereinafter, referred to as "other unit state information") regarding the other unit uplink signal is converted into an electrical signal (or a serial digital signal) by the second O/E converter 41d. The serial digital signal is converted into a parallel digital signal by the second SERDES 42b. The parallel digital signal is reformatted by the second deframer 43d and then transmitted to the digital signal processor 44.

An RU controller 49 may analyze an uplink signal received through the service antenna 48 and generate state information. As described above, the uplink signal may be input to the digital signal processor 44 via the AD converter 45b. The digital signal processor 44 may transmit the uplink signal to the RU controller 49. Therefore, the RU controller 49 may analyze the uplink signal and generate the state information. For example, the RU controller 49 may include a spectrum analysis unit (not shown). Accordingly, the RU controller 49 may analyze an uplink signal and generate state information regarding the uplink signal. At this time, the state information may include information about a bandwidth of the uplink signal or signal power information. Alternatively, the RU controller 49 may analyze the uplink signal and measure an SNR of the uplink signal. Accordingly, the state information may include the measured SNR of the uplink signal. As an alternative, the RU controller 49 may analyze the uplink signal and measure a VSWR of the uplink signal. Accordingly, the state information may include the measured VSWR of the uplink signal. As another alternative, the RU controller 49 may analyze the signal power of the uplink signal. Accordingly, the state information may include information about the measured signal power. In a similar manner, the RU controller 49 may analyze whether a predefined communication standard, such as signal power, SNR, ACLR, SEM, PIM, or existence or non-existence of a spurious signal, is satisfied, and may include an analysis result in the state information.

The RU controller 49 may analyze the other unit state information and decide a method of transmitting the other unit uplink signal. For example, the RU controller 49 may analyze whether a predetermined communication standard such as signal power, SNR, ACLR, SEM, PIM, or existence or non-existence of a spurious signal with respect to the other unit uplink signal, which is included in the other unit state information, is satisfied to determine whether the other unit uplink signal is normal. When it is determined that the other unit uplink signal is abnormal, the RU controller 49 may control the digital signal processor 44 so that the other unit uplink signal is not transmitted to an upper node (e.g., the MU 20, another RU 40 at an upper node, or the HUB 30 at an upper node). The digital signal processor 44 may perform digital processing on an uplink signal and/or an other unit uplink signal under the control of the RU controller 49. In particular, when the RU controller 49 informs that a specific signal is abnormal, the digital signal processor 44 may digitally combine normal signals other than the abnormal signal and output a combined signal to the first framer 43b. Accordingly, normal uplink signals and normal other unit uplink signals may be combined under the control of the RU controller 49 and then transmitted to an upper node.

The RU controller 49 may also analyze state information to determine whether an uplink signal is normal and may analyze other unit state information to determine whether an other unit uplink signal is normal. According to a determination result, the RU controller 49 may control the digital signal processor 44 to generate a third combined signal using normal signals and to generate a fourth combined signal using abnormal signals. In other words, the digital signal processor 44 may combine the normal signals to generate the third combined signal under the control of the RU controller 49. The digital signal processor 44 may also combine the abnormal signals to generate the fourth combined signal under the control of the RU controller 49.

Thereafter, the digital signal processor 44 may combine the third combined signal and the fourth combined signal and output a combined result to the first framer 43b. Alternatively, the digital signal processor 44 may sequentially or simultaneously output the third combined signal and the fourth combined signal to the first framer 43b without combining the third combined signal and the fourth combined signal. With this operation, an influence which an abnormal uplink signal (or other unit uplink signal) may exert on a normal uplink signal (or other unit uplink signal) may be decreased and an upper node may readily determine whether to service the abnormal uplink signal (or other unit uplink signal) which has been received separately from the normal uplink signal (or other unit uplink signal).

Meanwhile, the RU controller 49 may make a determination on a bandwidth in which an uplink signal is transmitted to an upper node. When it is determined that the bandwidth is wide enough to transmit the uplink signal and an other unit uplink signal all together, the RU controller 49 may perform control so that the uplink signal, state information, the other unit uplink signal, and other unit state information are transmitted to the upper node without being combined. However, when it is determined that the bandwidth is not wide enough to transmit the uplink signal and the other unit uplink signal all together, the RU controller 49 may perform control so that the uplink signal, the state information, the other unit uplink signal, and the other unit state information are combined and then transmitted to the upper node.

In FIG. 4, the first SERDES 42a, the second SERDES 42b, the first deframer 43a, the second deframer 43d, the first framer 43b, the second framer 43c, the digital signal processor 44, and the RU controller 49 may form a digital part which processes digital signals. At this time, the first SERDES 42a, the second SERDES 42b, the first deframer 43a, the second deframer 43d, the first framer 43b, the second framer 43c, and the digital signal processor 44 may be implemented in an FPGA; the RU controller 49 may be implemented in the FPGA or as a separate device.

Although it is illustrated that the first SERDES 42a, the second SERDES 42b, and the digital signal processor 44 are commonly used in both the downlink and uplink transmission paths, the first SERDES 42a, the second SERDES 42b, and the digital signal processor 44 may be separately provided for each of the paths. It is also illustrated in FIG. 4 that the first O/E converter 41a and the first E/O converter 41b are separately provided, but the first O/E converter 41a and the first E/O converter 41b may be implemented as a single optical transceiver module. It is also illustrated in FIG. 4 that the second O/E converter 41d and the second E/O converter 41c are separately provided, but the second O/E converter 41d and the second E/O converter 41c may be implemented as a single optical transceiver module.

The topology of a DAS and the structure of the MU 20, the HUB 30, and the RU 40 have been described above with reference to FIGS. 1 through 4. However, the structure shown in FIGS. 1 through 4 is just one embodiment and it is apparent that there may be various other applications.

Figure 5:
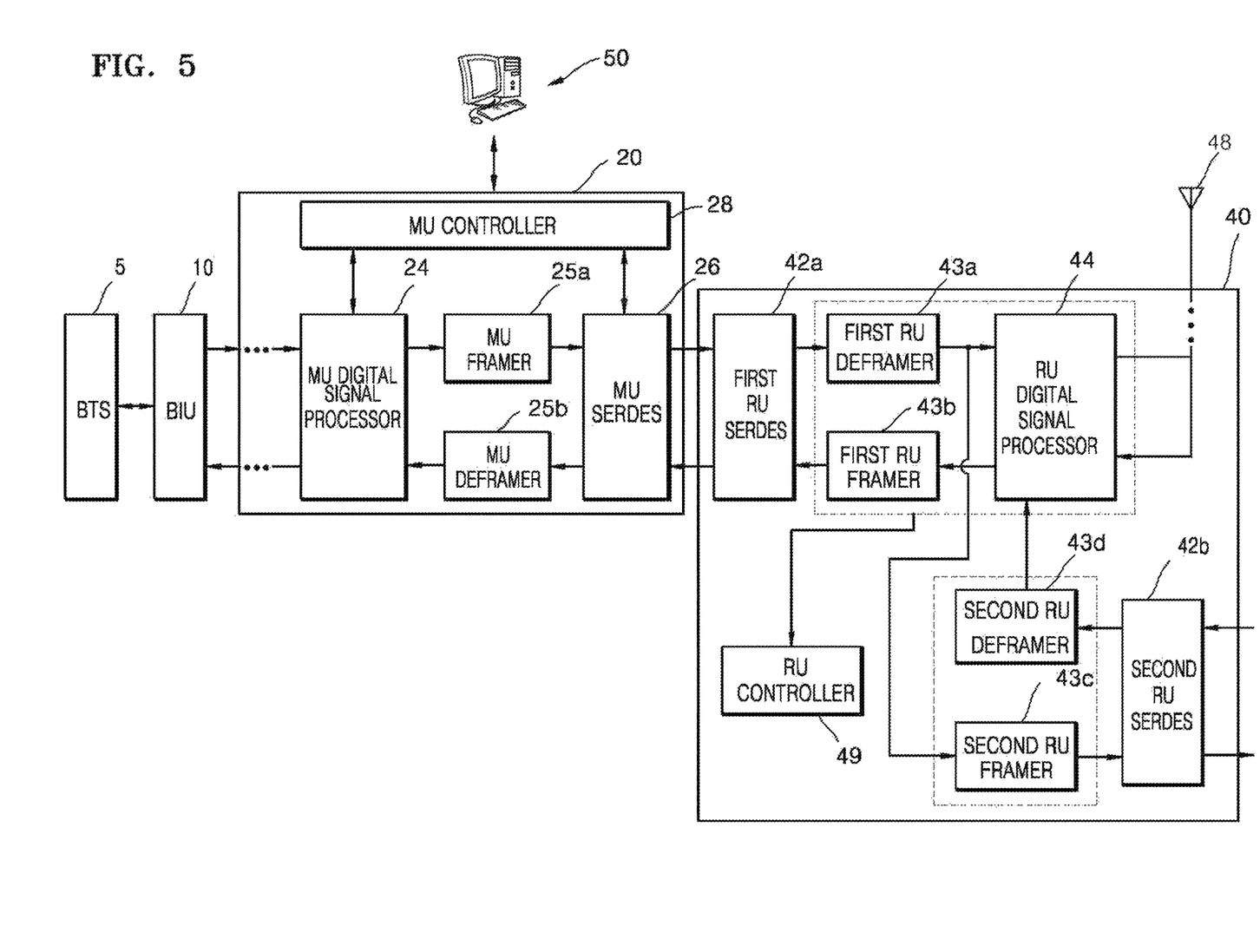
FIG. 5 is a diagram for explaining the operation of a monitoring device of a DAS according to an embodiment of the present invention.

FIG. 5 is a diagram for explaining the operation of a monitoring device of a DAS according to an embodiment of the present invention.

For convenience's sake, the HUB 30 is omitted; only the BTS 5, the BIU 10, the MU 20, the RU 40, and the monitoring device 50 are illustrated; only digital part is illustrated in the MU 20 and the RU 40 in FIG. 5. Although only one RU 40 is connected to the MU 20 in FIG. 5, two or more RUs 40 may be connected to the MU 20 and the RUs 40 may operate in the same or similar manners. Hereinafter, the operation of processing an uplink signal using the MU 20 and the RU 40 will be described with reference to FIG. 5. Although operations which will be described below may be performed by elements of the MU 20 and/or the RU 40, the operations are nearly the same as those described with reference to FIGS. 2 through 4. Thus, it will be described that the operations are performed by the MU 20 and/or the RU 40 for clarity of the description.

Referring to FIG. 5, the RU 40 may process an uplink signal received through the service antenna 48 and transmit the processed uplink signal to the MU 20. At this time, the RU 40 may transmit state information generated by the RU controller 49 with respect to the uplink signal to the MU 20 together with the uplink signal. The RU 40 may also analyze the state information and decide a method of transmitting the uplink signal. For example, the RU 40 may analyze the state information and, when the uplink signal is determined as abnormal, may not transmit the uplink signal to the MU 20. Alternatively, the RU 40 may transmit the uplink signal determined as abnormal to the MU 20 together with the state information to inform that the uplink signal is not normal.

When a lower node is connected to the RU 40, the RU 40 may receive an other unit uplink signal and/or other unit state information from another unit (not shown). The RU 40 may analyze the other unit state information and determine whether the other unit uplink signal is normal.

When it is determined that the other unit uplink signal is normal, the RU 40 may transmit the other unit uplink signal to the upper node, i.e., the MU 20. At this time, the RU 40 may combine the other unit uplink signal and the uplink signal (when the uplink signal is determined as normal) before transmitting them to the upper node. When a bandwidth is wide enough to transmit the other unit uplink signal and the uplink signal to the upper node without combining the signals, the RU 40 may transmit the other unit uplink signal and the uplink signal to the upper node without combining them.

When it is determined that the other unit uplink signal is abnormal, the RU 40 may not transmit the other unit uplink signal to the upper node. At this time, the RU 40 may transmit only the other unit state information to the upper node to inform that the other unit uplink signal is abnormal. Alternatively, the RU 40 may transmit the other unit uplink signal that is abnormal to the upper node together with the other unit state information so that the upper node may recognize that the other unit uplink signal is abnormal.

The RU 40 may generate a third combined signal by combining normal signals among uplink signals and other unit uplink signals and generate a fourth combined signal by combining abnormal signals among the uplink signals and the other unit uplink signals. The RU 40 may combine the third combined signal and the fourth combined signal and transmit a combined result to the upper node. At this time, the state information and the other unit state information may also be combined to be transmitted to the upper node. Alternatively, the RU 40 may transmit the third combined signal and the fourth combined signal to the upper node sequentially or simultaneously without combining them. At this time, the state information and/or the other unit state information corresponding to the normal signals may be combined into the third combined signal to be transmitted to the upper node and the state information and/or the other unit state information corresponding to the abnormal signals may be combined into the fourth combined signal to be transmitted to the upper node.

As described above, state information may include information about the state of an uplink signal, e.g., information about whether a predetermined communication standard, such as the bandwidth of the uplink signal, signal power information, SNR, VSWR, ACLR, SEM, PIM, or existence or non-existence of a spurious signal, is satisfied. Other unit state information may include information about the state of an other unit uplink signal, e.g., information about whether a predetermined communication standard, such as the bandwidth of the uplink signal, signal power information, SNR, VSWR, ACLR, SEM, PIM, or existence or non-existence of a spurious signal, is satisfied.

As described above, the RU 40 may analyze the state of an uplink signal received through the service antenna 48 and decide a method of transmitting the uplink signal. The RU 40 may also analyze the state of an other unit uplink signal transmitted thereto and decide a method of transmitting the other unit uplink signal.

When the MU 20 receives n uplink signals from n lower nodes (i.e., RUs 40), the MU 20 may determine the state of the n uplink signals and decide a method of transmitting them to the BTS 5. The MU 20 may determine n items of state information for the respective n uplink signals and transmit, to an upper node (i.e., the BTS 5), uplink signals determined as normal. At this time, the MU 20 may generate a first combined signal by combining normal signals among the n uplink signals and transmit the first combined signal to the upper node. Contrarily, the MU 20 may not transmit, to the upper node, abnormal signals among the n uplink signals. Alternatively, the MU 20 may generate a second combined signal by combining abnormal signals among the n uplink signals and transmit the second combined signal to the upper node. At this time, state information corresponding to the abnormal signals may be included in the second combined signal so that the upper node may recognize that uplink signals corresponding to the state information are abnormal.

The MU 20 may combine the first combined signal and the second combined signal and transmit a combined result to the BTS 5. Alternatively, the MU 20 may sequentially or simultaneously transmit the first combined signal and the second combined signal to the BTS 5 without combining them. With this operation, an influence which an abnormal uplink signal may exert on a normal uplink signal may be decreased and the BTS 5 may readily determine whether to service the abnormal uplink signal which has been received separately from the normal uplink signal.

The MU 20 may transmit state information, which has been received, to the monitoring device 50 connected thereto. The monitoring device 50 may analyze the state information and detect an RU 40 (i.e., an abnormally operating unit) which operates abnormally among the n RUs 40.

While the inventive concept has been particularly shown and described with reference to embodiments thereof, it will be understood that various changes in form and details may be made therein without departing from the spirit and scope of the following claims.

What is claimed is:

1. A node unit of a distributed antenna system, the node unit comprising:
   a signal receiver configured to receive uplink signals and state information including at least one signal characteristic of the uplink signals from a plurality of lower node units connected to the node unit; and
   a controller configured to:
   analyze whether a state of the uplink signals is normal or abnormal based on the state information,
   determine a transmitting method for transmitting the uplink signals from the node unit to at least one base station, based on the analyzed state of the uplink signals, and
   transmit the uplink signals by the determined transmitting method,
   wherein the controller is configured to process at least one first uplink signal analyzed as normal among the uplink signals differently from at least one second uplink signal analyzed as abnormal among the uplink signals.

2. The node unit of claim 1, wherein the controller does not transmit the at least one second uplink signal to the at least one base station.

3. The node unit of claim 1, wherein the controller transmits the state information to a monitoring device connected to the node unit and requests the monitoring device to analyze a unit state of the plurality of lower node units.

4. The node unit of claim 1, further comprising a digital signal processor configured to generate a first combined signal by combining the at least one first uplink signal among the uplink signals, and
   wherein the controller transmits the first combined signal to the at least one base station.

5. The node unit of claim 1, further comprising a digital signal processor configured to generate a second combined signal by combining the at least one second uplink signal among the uplink signals separately from the at least one first signal, and
   wherein the controller transmits the second combined signal to the at least one base station.

6. The node unit of claim 1, further comprising a digital signal processor configured to process a power level of each of the uplink signals to correspond to weight information,
   wherein the controller analyzes a signal-to-noise ratio (SNR) included in the state information and generates the weight information based on the analyzed SNR.

7. A node unit of a distributed antenna system, the node unit comprising:
   a service antenna configured to receive a first uplink signal from a mobile communication terminal;
   a controller configured to:
   generate first state information including at least one signal characteristic of the first uplink signal, analyze whether a state of the first uplink signal is normal or abnormal based on the first state information, determine a transmitting method for transmitting the first uplink signal from the node unit to an upper node unit based on the analyzed state of the first uplink signal, and transmit the first uplink signal by the determined transmitting method to the upper node unit; and a signal receiver configured to receive a second uplink signal and second state information including at least one signal characteristic of the second uplink signal from a lower node unit connected to the node unit, wherein the controller is further configured to analyze whether a state of the second uplink signal is normal or abnormal based on the second state information, and determine a transmitting method for transmitting the second uplink signal from the node unit to the upper node unit based on an analyzed state of the second uplink signal, and wherein the controller is configured to process the second uplink signal differently from the first uplink signal when the second uplink signal is analyzed as abnormal.

8. The node unit of claim 7, wherein the at least one signal characteristic is selected from the group consisting of a signal-to-noise ratio (SNR), a voltage standing wave ratio (VSWR), and an adjacent channel leakage ratio (ACLR) with respect to the first uplink signal.

9. The node unit of claim 7, wherein the controller controls the first uplink signal and the second uplink signal to be combined and then transmitted to the upper node unit when the second uplink signal is determined to be in a normal state according to a result of state analysis.

10. The node unit of claim 7, wherein the controller generates a third combined signal by combining the first uplink signal and the second uplink signal when the first state information and the second state information indicates that the first uplink signal and the second uplink signal are in a normal state, and fourth combined signal by combining the first uplink signal and the second uplink signal when the first state information and the second state information indicates that the first uplink signal and the second uplink signal are in an abnormal state.

11. A distributed antenna system comprising:

a plurality of remote units each configured to generate state information including at least one signal characteristic of an uplink signal received from a mobile communication terminal and transmit the state information and the uplink signal; and a master unit configured to:

analyze whether a state of the uplink signal received from each of the plurality of remote units is normal or abnormal based on the state information, determine a transmitting method for transmitting the uplink signal from the master unit to at least one base station based on the analyzed state of the uplink signal, and transmit the uplink signal by the determined transmitting method to the base station connected to the master unit, and wherein the master unit is configured to process at least one uplink signal analyzed as normal among uplink signals differently from at least one uplink signal analyzed as abnormal among uplinks signals.

12. The distributed antenna system of claim 11, wherein the master unit generates a first combined signal by combining the at least one uplink signal analyzed as normal, and transmits the first combined signal to the at least one base station.

13. The distributed antenna system of claim 11, further comprising a monitoring device configured to analyze a unit state of each of the plurality of remote units based on the state information received from the master unit.

14. The distributed antenna system of claim 11, wherein the master unit generates a second combined signal by combining at least one uplink signal analyzed as abnormal separately from the at least one unlink signal analyzed as normal, and transmit the generated second combined signal to the at least one base station.

15. The distributed antenna system of claim 11, wherein the at least one signal characteristic is selected from the group consisting of a signal-to-noise ratio (SNR), a voltage standing wave ratio (VSWR), and an adjacent channel leakage ratio (ACLR) with respect to the uplink signal.

16. The distributed antenna system of claim 11, wherein the master unit is further configured to analyze a signal-to-noise ratio (SNR) included in the state information, generate weight information based on the SNR and process a power level of the uplink signal to correspond to the weight information.

* * * * *